(12) United States Patent
Buchanan

(10) Patent No.: US 7,021,643 B1
(45) Date of Patent: Apr. 4, 2006

(54) ANGLED CAROUSEL TRAILER HITCH

(76) Inventor: Carl Buchanan, 3876 Ponderosa Rd., Ardmore, OK (US) 73401

( * ) Notice: Subject to any disclaimer, the term of this patent is extended or adjusted under 35 U.S.C. 154(b) by 0 days.

(21) Appl. No.: 11/108,453

(22) Filed: Apr. 18, 2005

(51) Int. Cl.
*B60D 1/07* (2006.01)

(52) U.S. Cl. .................................... 280/416.1
(58) Field of Classification Search ............. 280/415.1, 280/416.1; D12/162
See application file for complete search history.

(56) References Cited

U.S. PATENT DOCUMENTS

| | | | |
|---|---|---|---|
| 2,911,233 A | 11/1959 | Riddle | |
| 3,801,134 A | 4/1974 | Dees | |
| 4,456,279 A | 6/1984 | Dirck | |
| 4,729,571 A | 3/1988 | Tienstra | |
| 5,158,316 A | 10/1992 | Hutchmacher | |
| 5,322,313 A | 6/1994 | Schroeder | |
| 5,351,982 A | 10/1994 | Walrath | |
| D376,780 S * | 12/1996 | McCoy | D12/162 |
| 5,857,693 A * | 1/1999 | Clark, Jr. | 280/415.1 |
| 5,915,714 A | 6/1999 | Bell | |
| D415,725 S * | 10/1999 | Wyant | D12/162 |
| 6,428,031 B1 | 8/2002 | McCoy | |
| 6,497,428 B1 | 12/2002 | Ross | |
| 6,712,381 B1 * | 3/2004 | Moss | 280/491.1 |
| 6,974,148 B1 * | 12/2005 | Moss et al. | 280/511 |

* cited by examiner

*Primary Examiner*—Kevin Hurley
(74) *Attorney, Agent, or Firm*—Randal D. Homburg

(57) ABSTRACT

A carousel trailer hitch, providing an adaptive hitch for a box trailer hitch mounted underneath a vehicle bumper attached to a vehicle frame, includes a box hitch attaching end to which is attached an angled spindle having a rotating carousel base member having a plurality of angled support arms, upon which is provided a plurality of varied ball hitches and implement hitch which may be rotated without being impeded by the bumper of the vehicle by the carousel base member being presented at an angle, with the support arms being further angle to provide each of the plurality of varied ball hitches and implement hitch at a level towing angle.

6 Claims, 3 Drawing Sheets

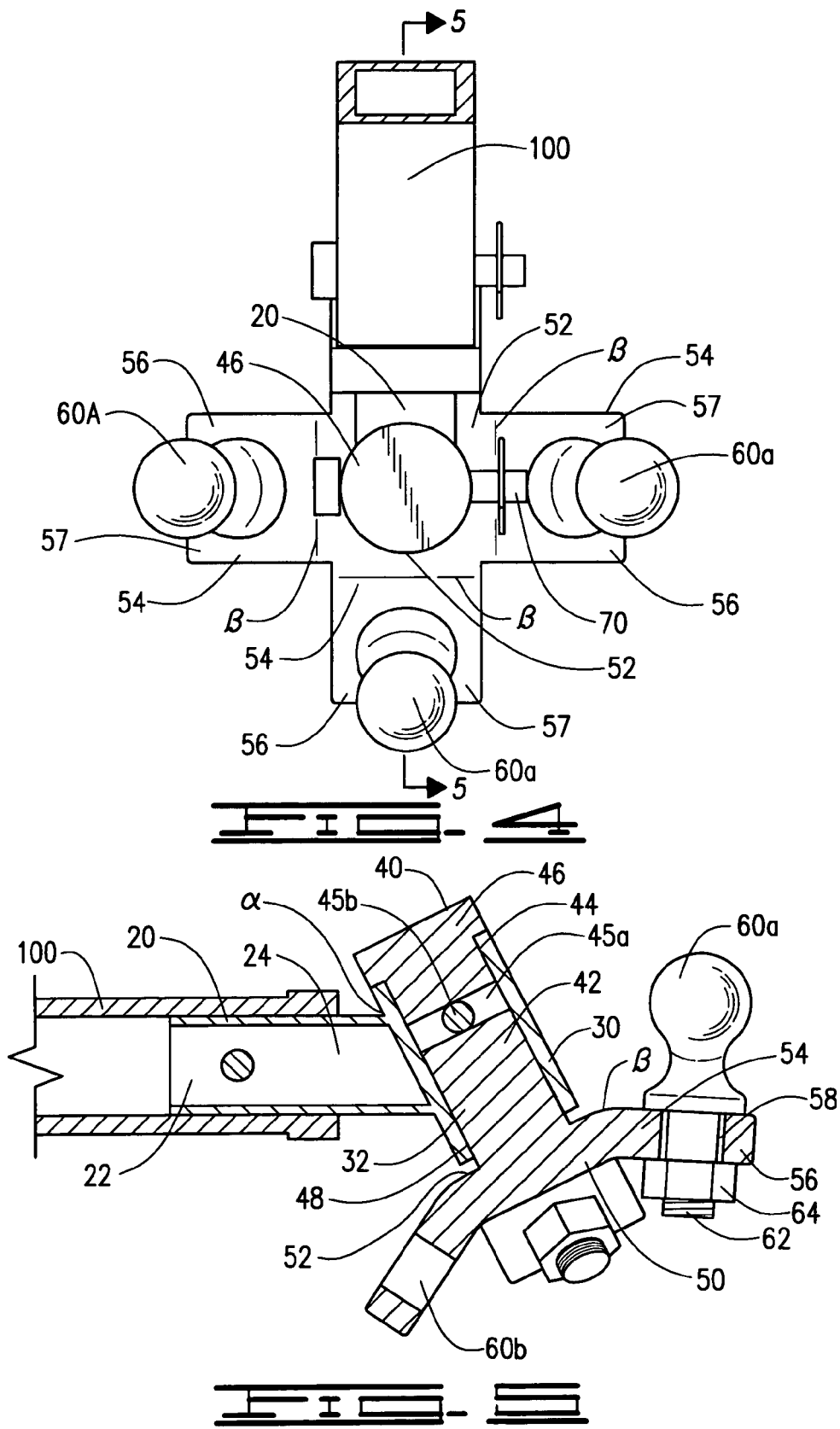

ANGLED CAROUSEL TRAILER HITCH

CROSS REFERENCE TO RELATED APPLICATIONS

None

I. BACKGROUND OF THE INVENTION

1. Field of Invention

A carousel trailer hitch, providing an adaptive hitch for a box receiver hitch mounted underneath a vehicle bumper and attached to a vehicle frame, includes a box hitch attaching end to which is attached an angled spindle having a rotating carousel base member having a plurality of angled support arms, upon which is provided a plurality of varied ball hitches and implement hitch which may be rotated without being impeded by the bumper of the vehicle by the carousel base member being presented at an angle, with the support arms being further angle to provide each of the plurality of varied ball hitches and implement hitch at a level towing angle.

2. Description of Prior Art

The following United States patents were discovered and are disclosed within this application for utility patent. All relate to trailer hitches with multiple attaching points adapted to either an existing hitch or adapted to a towing vehicle.

In U.S. Pat. No. 5,915,714 to Bell, a hitch frame is mounted to a vehicle frame after which a carousel plate is mounted to the underside of a projecting plate providing three ball hitches mounted to extension arms welded to the carousel plate and a box hitch receiver. It is not adapted to be attached to a factory box hitch of a vehicle. It is a substitute for a factory box hitch.

In three U.S. Pat. No. 6,497,428 to Ross, U.S. Pat. No. 5,351,982 to Walrath and U.S. Pat. No. 5,322,313 to Schroeder, multiple ball hitches adapted to a box hitch are disclosed. Ross includes a vehicle attaching member extending beyond a bumper, with a bolt attaching an upper and lower circular plate, the upper plate having three ball hitches welded to the upper surface of the upper plate and the lower plate being welded to the vehicle attaching member, with the upper plate turning upon the lower plate around the bolt with a plurality of holes in the upper plate being aligned with a single hole in the lower plate engaged and locked by a locking pin. Schroder includes a vehicle mounting member with an upper C-shaped arm extending over the member with a disk having a plurality of mounting balls welded to its upper surface with a spring loaded locking pin suspended above the mounting plate engaging selected holes in the mounting plate to lock the plate into a position. Walruth has a similar plate with an upward curved arm supporting the plate from a box hitch mounting arm with the selected ball locked into position by the tightening of a central bolt.

U.S. Pat. No. 5,158,316 to Hutchmacher and U.S. Pat. No. 4,456,279 to Direk have plates mounting directly to a flat portion of a pickup bumper at the conventional ball mounting location, with Hutchmacher having a plate mounted to the bumper and a rotating member in a hole in the plate, with the varied ball hitches attached to the rotating plate and Direk having a circular plate with ball hitches attached to it directly attached to the flat portion of the bumper. A bumper mounted multiple ball hitch is disclosed in U.S. Pat. No. 2,911,233 to Riddle. It is not adapted to a box hitch.

A multiple ball device is disclosed in U.S. Pat. No. 4,729,571 to Tienstra provides some type of mounting base attached to a vehicle with the balls rotating in a vertical circular pathway perpendicular to rotational axis, while U.S. Pat. No. 3,801,134 to Dees provides another mounting base allowing for vertical rotation around the rotational axis.

None of these devices provide a multiple hitch device adapted to a box receiver hitch having a receiver hitch attaching member attached to a cylindrical collar at a 30 degree angle, the cylindrical collar having a central bore within which a central spindle is rotatably engaged, the central spindle having a shaft, an upper end with a spindle cap larger than the central bore, and a lower end to which is attached a flat middle portion of a cross arm member with at least four terminal ends bent at a 30 degree angle extending from the flat middle portion, each terminal end having a different sized ball hitch or an implement hitch receiver, the cylindrical collar and the shaft of the central spindle having transverse bores which when aligned, receive a locking pin to retain the central spindle within the cylindrical collar at a fixed position. The 30 degree angle of the cylindrical collar allows for complete rotation of the cross arm member with the hitch balls mounted to the terminal ends without the hitch balls coming into contact with the receiver hitch to which the device attaches, while presenting the selected terminal end in a horizontal plane for level towing, reducing the profile of the device when attached to the receiver hitch, and minimizing the length of the attaching member to reduce lateral stress of the attaching member, improving the overall strength and utility of the device.

II. SUMMARY OF THE INVENTION

In agriculture and construction, a variety of device are towed which have different sized towing balls and hitch attachments. Farm implements often having a simple tongue which present attachment by a hitch pin. Instead of having to change the entire hitch or ball for each implement towed, it is known in the art that multiple ball hitch devices serve a convenience in not having to change hitches by having multiple hitch balls on a rotating axis, the appropriate hitch ball merely dialed and locked into position for towing. However, the present art devices either have elongated attaching members to prevent contact between the rotating balls, or have required elevating arms to extend the rotating portion beyond contact with a bumper or the receiver hitch when rotated. It would be more appropriate to present a towing hitch adapting device that had a shortened attaching member that would allow for rotation of the several ball hitches without coming into contact with the receiver hitch. By presenting an angled rotating plate in relation to the attaching member which directed rotation of the ball hitches below the receiver hitch while maintaining the selected ball hitch in a level horizontal towing plane, one eliminates the need for an elongated attaching member and eliminates contact between the hitch balls and the receiver hitch.

The primary objective of the invention is to provide a multiple hitch device attaching to a box type receiver hitch, primarily those which are factory installed, which allows for rotation of a plurality of hitch balls and implement hitches which may be rotated while attached to the receiver hitch without the hitch balls making contact during rotation with the receiver hitch.

III. DESCRIPTION OF THE DRAWINGS

The following drawings are submitted with this utility patent application.

FIG. 4 is an upper perspective view of the hitch device along perspective lines 4/4 of FIG. 3.

FIG. 5 is a side cross sectional view of the hitch device along section lines 5/5 of FIG. 4.

IV. DESCRIPTION OF THE PREFERRED EMBODIMENT

Figure 1:
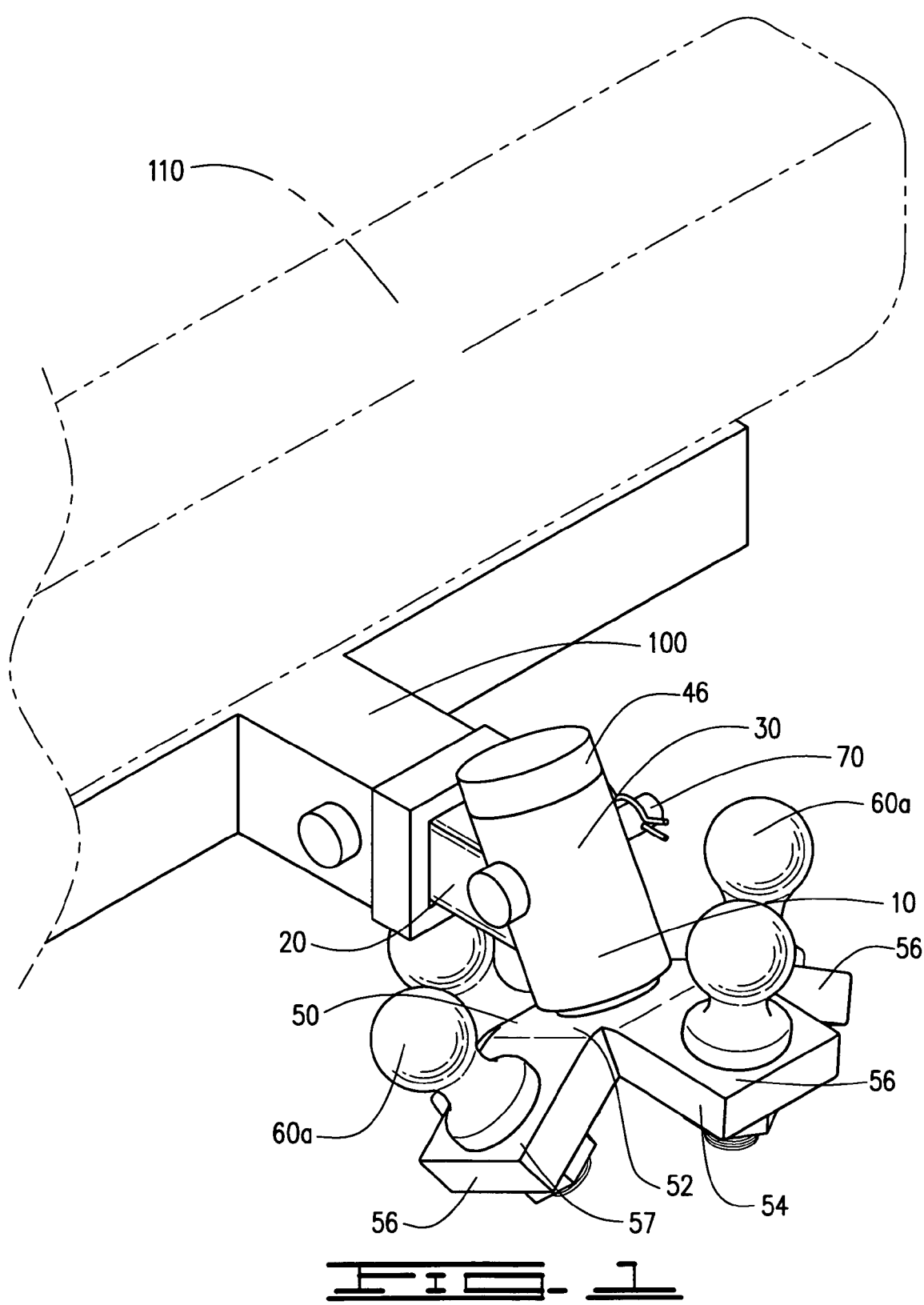
FIG. 1 is an upper perspective view of the hitch device installed within the box receiver hitch of a towing vehicle.

A multiple attachment trailer hitch device 10, shown in FIGS. 1–5 of the drawings, adapted to a box receiver hitch 100 of a towing vehicle 110, comprises a receiver hitch attaching member 20 having a first end 22 adapted to be inserted in the box receiver hitch 100, and a second end 24 attached to a cylindrical collar 30 at a first acute angle α, the cylindrical collar 30 having a central bore 32, a central spindle 40 having a shaft 42 rotatably engaged within the central bore 32 of the cylindrical shaft 30, the central spindle 40 having an upper end 44 welded to a spindle cap 46 larger than the central bore 32 and a lower end 48 welded to a flat intersecting portion 52 of a cross arm member 50 with at least four arms 54 having terminal ends 56 emanating from the flat intersecting portion 52 bent downward at a second acute angle β, each terminal end 56 having an upper surface 57 to which is attached a different sized ball hitch 60a or implement hitch receiver 60b, the cylindrical collar 30 having a single transverse bore 35 and the shaft 42 of the central spindle 40 further having at least two opposing transverse bores 45a, 45b which, when aligned, receive a locking pin 70 to retain the central spindle 40 within the cylindrical collar 30 at a fixed position, wherein the first acute angle α between the central collar 30 and the receiver hitch attaching member 20 allows for complete rotation of the cross arm member 50 without the ball hitches 60a coming into contact with the receiver hitch attaching member 20 or the receiver hitch 100 while rotating the central spindle 40 for selection of the appropriate sized ball hitch 60a or implement receiver hitch 60b, while the second acute angle β of each arm 54 presents the selected ball hitch 60a or implement receiver hitch 60b directed away from the box receiver hitch 100 in a horizontal plane for level towing.

As shown in FIGS. 1–4, the cross arm member 50 has a X shaped embodiment, providing three different sized ball hitches 60a and an implement hitch receiver 60b, the ball hitches 60a being either welded, not shown, or attached to each terminal end 56 through a bolt hole 58, by a threaded extension 62 retained by a bolt 64 onto the terminal end, FIGS. 1–3 and 5. The entire device 10 should be constructed out of a heavy gauge steel suited for the load requirements of the devices being towed. Although shown with four terminal ends 56 in the drawings, it is contemplated that the cross member 50 could have any number of terminal ends 56 greater than two. The first acute angle α between the cylindrical collar 30 and the receiver hitch attaching member 20 and the second acute angle β along each of the at least four arms 54 would most preferably be 30 degree angles, but in any case the first and second acute angles α, β must be equal and opposite.

Figure 2:
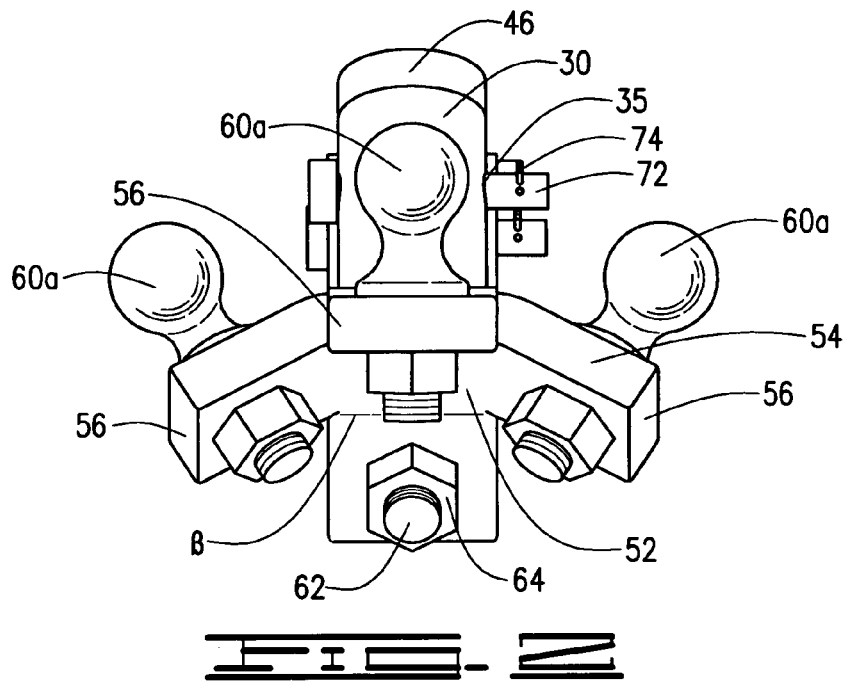
FIG. 2 is a front view of the hitch device.
Figure 3:
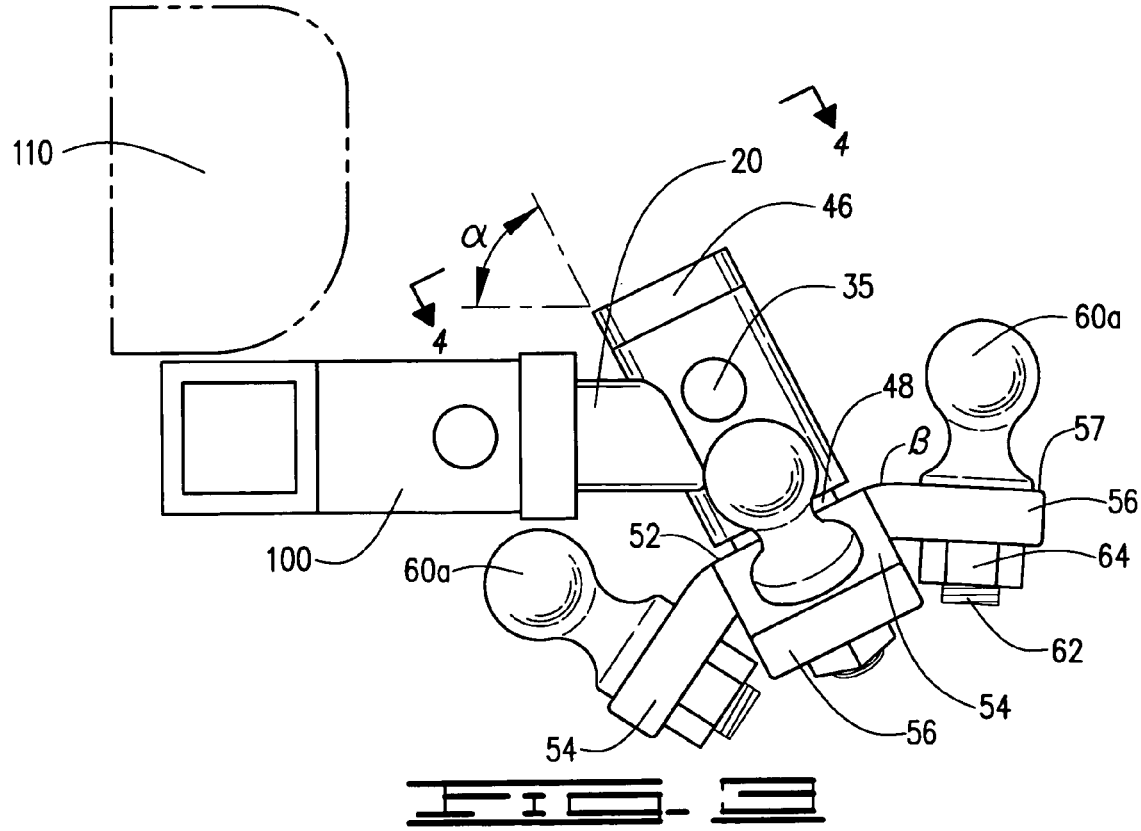
FIG. 3 is a side view of the hitch device installed within the box receiver hitch of a towing vehicle with phantom lines indicating the bumper of the towing vehicle.

As further defined and shown in FIG. 5, the cylindrical collar 30 would have the single transverse bore 35 as previously indicated, while the shaft 42 of the central spindle 40 would have preferably two opposing transverse bores 45a, 45b, each of the at least two opposing transverse bores 45a, 45b aligned with two opposite arms of the cross arm member 50. It would be preferred that the transverse bore 35 of the cylindrical collar 30 would be perpendicular to the receiver hitch attaching member 20 so that insertion of the locking pin 70 would be accomplished aside from the presented selected terminal end having the ball hitch or implement hitch receiver being used for towing, as indicate in FIG. 1. As shown in FIGS. 1, 2 and 4, the locking pin 70 is a hitch pin 72 with a cotter pin 74 to retain the hitch pin 72 in placed to secure the shaft 42 of the central spindle 40 within the cylindrical collar 30.

The primary advantage of this device 10 over the prior art, especially those having only one ball hitch or one implement hitch, is that in construction or farming, towed trailers or implements have a variety of different sized hitches, requiring the owner of the towing vehicle to have more than one ball hitch or implement hitch receiver available for towing. He would ordinarily be required to carry several different receiver hitches with each single ball hitch or implement hitch receiver in his towed vehicle and have to determine which ball hitch or implement hitch receiver was appropriately sized for the towed trailer or implement, remove the improperly sized hitch from the receiver hitch, install the appropriately sized hitch into the receiver hitch and place the removed and inappropriately sized hitch into the towing vehicle. Each change of implement or trailer would require the removal and installation and the keeping of the variety of hitches in the towed vehicle.

Utilizing the disclosed device 10, shown in the drawings, at least four ball hitches on a single device, installed one time into the receiver hitch, allows one to change the ball hitch by simple removal of the locking pin 70, rotation of the cross arm member 50 until the correctly matched ball hitch is presented towards the trailer or implement, and reinsertion of the locking pin 70 to lock the cross arm member 50 in place.

While the invention has been particularly shown and described with reference to a preferred embodiment thereof, it will be understood by those skilled in the art that changes in form and detail may be made therein without departing from the spirit and scope of the invention.

What is claimed is:

1. A multiple attachment trailer hitch device adapted to a box receiver hitch of a towing vehicle comprising:

a receiver hitch attaching member having a first end adapted to be inserted in said box receiver hitch, and a second end;

a cylindrical collar attached to said second end at a first acute angle, said cylindrical collar having a central bore;

a central spindle having a shaft rotatably engaged within said central bore of said cylindrical shaft, said central spindle having an upper end welded to a spindle cap larger than said central bore and a lower end, said cylindrical collar having a single transverse bore and said shaft of said central spindle further having at least two opposing transverse bores which, when aligned, receive a locking pin to retain said central spindle within said cylindrical collar at a fixed position;

a cross arm member having a flat intersecting portion welded to said lower end, said cross arm member further providing at least four arms having terminal ends emanating from said flat intersecting portion bent downward at a second acute angle, each terminal end having an upper surface; and a plurality of different sized ball hitches and an implement hitch receiver attached to said upper surface of each said terminal end, wherein said first acute angle between said central collar and said receiver hitch attaching member allows for complete rotation of said cross arm member without said ball hitches coming into contact with said receiver hitch attaching member or said box receiver hitch while rotating said spindle for selection of one of said plurality of different sized ball hitches and implement hitch receiver, while said second acute angle on each said arm presents said one ball hitch or implement hitch receiver directed away from said box receiver hitch in a horizontal plane for level towing.

2. The device, as disclosed in claim 1, wherein said cross arm member has an X shape and further provides three different sized ball hitches and an implement hitch receiver attached to four terminal ends on four arms and said first and second acute angles between the cylindrical collar and the receiver hitch attaching member and along each of the at least four arms are 30 degree angles which are equal and opposite.

3. The device, as disclosed in claim 1, said cylindrical collar having said single transverse bore, while said shaft of said central spindle has two opposing transverse bores, each of said at least two transverse bores aligned with two opposing arms of said cross member, said transverse bore of said cylindrical collar perpendicular to said receiver hitch attaching member so that insertion of said locking pin is accomplished aside from said terminal end having said one ball hitch or implement hitch receiver being used for towing.

4. A multiple attachment trailer hitch device adapted to a box receiver hitch of a towing vehicle comprising:
- a receiver hitch attaching member having a first end adapted to be inserted in said box receiver hitch, and a second end
- a cylindrical collar attached to said second end at a first 30 degree angle, said cylindrical collar having a central bore;
- a central spindle having a shaft rotatably engaged within said central bore of said cylindrical shaft, said central spindle having an upper end welded to a spindle cap larger than said central bore and a lower end, said cylindrical collar having a single transverse bore and said central spindle further having at least two opposing transverse bores which, when aligned, receive a locking pin to retain said central spindle within said cylindrical collar at a fixed position;
- a cross arm member having a flat intersecting portion welded to said lower end, said cross arm member further providing at least four arms having terminal ends emanating from said flat intersecting portion bent downward at a second 30 degree angle, each terminal end having an upper surface; and
- a plurality of different sized ball hitches and an implement hitch receiver attached to said upper surface of each said terminal end, wherein said first 30 degree angle between said central collar and said receiver hitch attaching member allows for complete rotation of said cross arm member without said ball hitches coming into contact with said receiver hitch attaching member or said box receiver hitch while rotating said spindle for selection of one of said plurality of different sized ball hitches and implement hitch receiver, while said second 30 degree angle on each said arm presents said one ball hitch or implement hitch receiver directed away from said box receiver hitch in a horizontal plane for level towing.

5. The device, as disclosed in claim 4, wherein said cross arm member has an X shape and further provides three different sized ball hitches and an implement hitch receiver attached to four terminal ends on four arms and said 30 degree angles between the cylindrical collar and the receiver hitch attaching member and along each of the at least four arms are equal and opposite.

6. The device, as disclosed in claim 4, said cylindrical collar having said single transverse bore, while said shaft of said central spindle has two opposing transverse bores, each of said at least two transverse bores aligned with two opposing arms of said cross member, said transverse bore of said cylindrical collar perpendicular to said receiver hitch attaching member so that insertion of said locking pin is accomplished aside from said terminal end having said one ball hitch or implement hitch receiver being used for towing.

* * * * *